US006797227B2

United States Patent
Addiego

(10) Patent No.: US 6,797,227 B2
(45) Date of Patent: Sep. 28, 2004

(54) METHOD FOR MAKING ALUMINA CELLULAR EXTRUDATES

(75) Inventor: William P. Addiego, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 30 days.

(21) Appl. No.: 10/298,350

(22) Filed: Nov. 18, 2002

(65) Prior Publication Data

US 2004/0097362 A1 May 20, 2004

(51) Int. Cl.$^7$ ................................................. B28B 3/20
(52) U.S. Cl. ..................................... 264/630; 264/638
(58) Field of Search ................................. 264/630, 638

(56) References Cited

U.S. PATENT DOCUMENTS

| | | | |
|---|---|---|---|
| 3,975,202 A | 8/1976 | Emblem | 501/127 |
| 3,983,197 A | 9/1976 | Mitsche | 264/623 |
| 4,349,637 A | 9/1982 | Miedaner | 501/126 |
| 4,605,428 A * | 8/1986 | Johnson et al. | 65/395 |
| 4,631,267 A | 12/1986 | Lachman | 502/439 |
| 5,244,852 A | 9/1993 | Lachman | 502/66 |
| 6,617,292 B2 * | 9/2003 | Perron et al. | 510/119 |

* cited by examiner

*Primary Examiner*—Christopher A. Fiorilla
(74) *Attorney, Agent, or Firm*—Kees van der Sterre

(57) ABSTRACT

Crack-free alumina honeycombs are made by comminuting anhydrous aluminum oxide powder, blending and mulling the powder with an aluminum oxide or aluminum hydroxide permanent binder, a polymeric aluminum salt, a temporary binder, an aqueous acidic peptizing agent, and water, and thereafter homogenizing, extruding, drying and firing the extrudate to form the crack-free honeycomb.

4 Claims, No Drawings

METHOD FOR MAKING ALUMINA CELLULAR EXTRUDATES

BACKGROUND OF THE INVENTION

The invention relates to monolithic catalyst support structures formed of alumina, and particularly to new batch compositions and methods for forming complex alumina structures such as alumina honeycombs that overcome some of the limitations of prior art alumina ceramics. Honeycombs provided in accordance with the invention offer particular advantages as column packings in fixed-bed chemical reactors to reduce pressure drop, control temperature distribution, improve the uniformity of reactant distribution, and increase mass transfer efficiency.

Ceramic honeycomb structures composed of alumina and produced by the extrusion of plasticized alumina powder batches containing appropriate binder constituents are known. U.S. Pat. No. 4,631,267 to Lachman et al. describes a variety of permanent binder materials useful for producing relatively strong honeycombs of alumina at relatively low temperatures.

U.S. Pat. No. 3,983,197 describes the production of alumina catalyst extrudates by extruding, drying, and calcining a mixture formed of finely divided alumina, an alumina hydrosol, and water. The alumina hydrosol is characterized as a source of alumina as well as a binder and/or lubricant that obviates the need for additional extraneous binders or lubricants. An alumina-based cement for binding alumina fibers together into a selected shape is described in U.S. Pat. No. 4,349,637. That patent discloses alumina-based formulations consisting of a mixture of colloidal alumina, aluminum chlorhydrate, water, and hydrochloric or nitric acids.

U.S. Pat. No. 3,975,202 utilizes aluminum hydroxyhalides to form rigid gels from solutions comprising acetate lactate accelerators. U.S. Pat. No. 5,244,852 discloses catalyst support coatings containing molecular sieves such as zeolites provided from slurries comprising the zeolites in combination with selected binders. The binders can be selected from the group consisting of high surface areas aluminas and their precursors. Examples are transition aluminas derived from pseudoboehmite, other hydrated aluminas, hydrolyzed aluminum alkoxides such as aluminum isopropoxide, and aluminum chlorhydrates, with the preferred binder being gamma alumina developed by firing pseudoboehmite to 500–600° C.

While alumina honeycombs offer significant advantages as catalysts or catalyst supports in chemical reactors designed for carrying out a number of different catalytic reactions, problems with the manufacture of such supports remain. For example, cracking frequently occurs as the extruded honeycombs are dried and fired following extrusion, this cracking being associated in many cases with the shrinkage that occurs as included in the extrusion batch are removed or consolidated.

Another manufacturing problem arises from the need to provide both high fired strength and high fired surface area in the honeycombs. In general the high firing temperatures needed to enhance honeycomb strength also tend to reduce the porosity and surface area of the alumina materials used to form the product.

SUMMARY OF THE INVENTION

The invention provides extrusion batch compositions for alumina honeycombs that incorporate novel binder combinations for improved honeycomb extrusion, drying and firing. The binder combinations include both hydrous aluminum oxide permanent binders and polymeric aluminum salts in various combinations. These combinations impart high strength, high active surface area, and controlled pore size distribution to the final body. Honeycombs produced from these improved extrusion batch compositions can be used as catalyst or catalyst support packings in chemical reactors for a wide variety of chemical, petrochemical, and petroluem refining processes. In addition, the batch compositions themselves offer improved batch rheology for extruded honeycomb manufacturing.

The principal component of the extrusion batch compositions of the invention is alumina powder of controlled particle size. Useful alumina powders include alpha alumina, gamma alumina and any of a number of other transition aluminas that have been produced or comminuted to the required particle size. In general these aluminas are anhydrous materials, i.e., they are substantially free of chemically bound water.

Also included in the extrusion batch is at least one precursor for a permanent alumina binder. By a permanent binder is meant a constituent that remains in the honeycomb after firing and is effective to increase the fired strength thereof. Precursors for permanent alumina binders are well known, families of which include colloidal or other finely divided aluminum hydroxides or oxy-hydroxides. These can be synthetic or naturally occurring aluminum hydroxides and hydrated aluminum oxides, specific examples of which include boehmites and pseudoboemites as well as native aluminum hydroxides such as bayerite and gibbsite.

While batches comprising hydroxy aluminum oxide binding constituents alone can form extruded honeycombs, significant advantages including low firing shrinkage and higher active surface area after firing are obtained if an aluminum salt is included as an additional binding constituent in the batch. While carboxylate, nitrate, sulfate, or chloride salts of aluminum can be used for this purpose, a preferred class of salts includes the polymeric hydroxy-aluminum salts (PAS), a specific example of which is polymeric aluminum chlorhydrate (ACH). It is the combination of these salts with conventional aluminum hydroxide or oxy-hydroxide binder precursors that provides the unexpected improvements in fired honeycomb properties that are observed.

In addition to the permanent binders, the extrusion batch will include a temporary organic binder. Suitable temporary binders act to improve the plasticity and cohesion of the batch during the extrusion process, and to enhance the strength of the green extruded body throughout the drying process. In most cases they are completely or substantially completely burned out of the honeycomb at the firing temperatures required.

A variety of different organic compounds and mixtures are well known in the art to have utility as temporary binders. Cellulosic binders such as methyl cellulose are particularly useful for honeycomb extrusion, but other useful compounds are known, including those described, for example, by S. Levine in "Organic (Temporary) Binders for Ceramic Systems, *Ceramic Age*, 75(1), 39+ (January 1960) and "Temporary Organic Binders for Ceramic Systems", *Ceramic Age*, 75(2), 25+ (February 1960).

Also important for securing high fired strength in alumina honeycombs is the use of an aqueous acidic peptizing agent in the extrusion batch. These agents, which are typically introduced as dilute organic or mineral acid additions to the water component of the batch, are thought to generate additional hydrated alumina species that promote stronger aluminum oxide inter-particle bonding during the drying and firing stages of honeycomb manufacture. Acetic acid is the presently preferred agent.

Also provided according to the invention is a method for producing crack-free alumina honeycombs of high strength and high active (pore) surface area. In accordance with that method, an aluminum oxide powder is first selected, that powder generally being a comminuted powder that is either produced in finely divided form or converted to that form by the processing of coarser powders.

The selected alumina powder is blended and mulled with a combination of binders, including an alumina precursor such as an aluminum hydroxide or oxy-hydroxide, a polymeric aluminum salt, and a temporary binder. These are mulled together with water and a selected aqueous acidic peptizing agent, the viscosity of this batch mixture being adjusted by means of the water addition into a range suitable for later extrusion.

The batch mixture thus blended is plasticized by mixing, and is then extruded through a honeycomb die to form a honeycomb extrudate. The extrudate is then dried and fired to provide alumina honeycomb products.

A particular advantage of this process is that, through the inclusion of effective amounts of both hydrous aluminum oxide and polymeric aluminum salt binder components in the batch, honeycomb linear shrinkage during drying and firing can be controlled to less than 10%. Proportionate increases in the production yield of crack-free honeycombs of high strength and high active surface area are thereby secured.

DETAILED DESCRIPTION

For the purpose of shrinkage control and to secure high active surface area in the fired alumina honeycombs it is desirable that the major alumina powder component of the batch be of relatively fine particle size as well as free of bound water. The preferred alumina powder is gamma alumina powder, supplied or milled to an average particle size not exceeding about <25 $\mu$m and then sieved to −250 mesh (U.S. Standard Sieve) to remove coarse particle fractions.

Aluminum hydroxide or oxy-hydroxide precursors for the permanent alumina binders in the batch may be introduced in either liquid or solid form. Dispersions, suspensions, or solutions of these precursors in liquid diluents are commercially available, and these can be directly blended with the alumina batch powders and temporary binders for mixing and mulling. The binder particles in these preparations are typically broken down to virtually crystallite size (below 200 angstroms) so that particle size is not a concern.

Where solid aluminum hydroxide or oxy-hydroxide binder precursors that include coarse agglomerates are employed, these should be comminuted to a particle size range similar to that of the alumina powder and desirably dry-blended therewith. The preferred solid precursors are aluminum hydroxides such as gibbsite or bayerite, and aluminum oxy-hydroxides such as boehmite.

Polymeric aluminum salts useful in accordance with the invention include those made directly by the polymerization of aqueous aluminum chloride solutions or other aluminum salts. These are prepared in buffered solutions within a pH in the range of about 4 to 4.8.

Suitable aluminum chlorohydrates are commercially available in both liquid and solid form. Aqueous polymeric salt solutions such as CHLORHYDROL 50% or REHABOND CB-65S are available from Reheis, Inc. of Berkeley Heights, N.J. Suitable organic derivatives such as REHYDROL II aluminum chlorohydrex are available from the same source, these being soluble in anhydrous alcohols and useable directly in that form. Commercially available solid aluminum chlorohydrates such as CHLORHYDROL powder from Reheis, Inc. are preferably pre-dissolved in water before blending with the other batch constituents.

The advantages of binder systems combining a polymeric aluminum salt such as aluminum chlorhydrate with an aluminum oxy-hydroxide such as boehmite with an alumina powder such as gamma-alumina are several. These advantages include the retention of higher active surface areas at higher firing temperatures than are observed in batches using either binder alone.

In addition, significantly less batch water (e.g., 25 wt % less water in some cases) is needed to reach a batch viscosity suitable for honeycomb extrusion. Depending on the extent of these batch water reductions, extrudate shrinkage can be reduced by 30–55%. These shrinkage reductions result in valuable improvements in production yields for thin-walled alumina honeycomb shapes, which are otherwise particularly fragile and prone to cracking during the drying stages of manufacture.

The exact proportions of alumina powder, permanent and temporary binders, water and peptizing acid additions in the batch may of course vary depending upon the particular extrusion, drying and firing processes and equipment to be employed for the manufacture of the alumina honeycombs. However, typical batches incorporating binder combinations in accordance with the invention will include, in weight percent on a dry basis (exclusive of any liquid carriers or diluents), about 70–80% of alumina powders, 10–15% of permanent alumina binder precursors selected from the group consisting of aluminum hydroxides and oxy-hydroxides, 10–15% of polymeric aluminum salts, and 2–6% of temporary organic binders. The liquid components of the batch, including the batch water and the aqueous acid peptizing agents as well as any liquid fractions of any binder additions employed, will be present in proportions ranging about 55–85% of the wet batch, i.e., including all of the added liquids.

These batches may of course include other binder, powder, and liquid constituents for purposes known in the art. Included among the optional binder constituents are aluminum alkoxides that are convertible to alumina binding phases by hydrolysis before or during firing. Additional transition metal, rare earth or alkaline earth salts can also be included, most preferably in the form of aqueous solutions that can be easily dispersed in the batch. These can impart additional strength and surface area to the fired honeycombs, or can function as in situ heterogeneous catalysts for enhancing process efficiency in certain chemical reactions.

The batch components above described should be combined in a manner that will provide a homogeneous or substantially homogeneous mixture. Normally, the dry ingredients are first premixed, preferably in an intensive mixer, and then combined with the liquid ingredients with further mixing. Conventional mixing equipment can be used, with the use of a mix muller being preferred. If desired to complete mixing and to promote more rapid plasticization of the wet batch, the mulled blend may be preliminarily extruded through a "spaghetti" die one or a number of times. This facilitates the subsequent forming into the desired honeycomb structure by a final extrusion through a honeycomb die.

Wet or "green" honeycomb extrudates formed as described are next dried, typically at temperatures in the range of 100–120° C., employing a drying rate sufficiently low to prevent uneven drying and cracking of the honeycomb bodies. Conventional ovens, electromagnetic drying equipment, or combinations thereof may be used.

Following drying the green honeycomb shapes are fired to temperatures in the range of about 500–1000° C. to convert the permanent binder precursors to permanent alumina binding phases, thus to solidify the honeycombs. The peak firing temperature employed in each case will generally be the minimum temperature needed to reach the required level of strength for the particular honeycomb application intended. Higher temperatures, which can adversely affect the active (pore) surface area of the honeycomb, will usually be avoided.

The invention may be further understood by reference to the following working example, which is intended to be illustrative rather than limiting.

EXAMPLE

A batch composition for an alumina honeycomb in accordance with the invention, hereinafter designated Batch A, is first prepared. To compound this batch a formulation including alumina powder, a mixed permanent binder made up of aluminum chlorhydrate powder and boehmite powder, and a methylcellulose temporary binder is prepared and dry blended in a mix-muller to obtain a homogeneous dry mix. Specific components of the dry mix include 70 parts by weight of Versal GH-22 gamma alumina, 15 parts by weight of Reheis Micro-Dry® Chlorhydrol® aluminum chlorhydrate, 15 parts by weight of Condea Catapal B® boehmite powder, and 6 parts by weight of Methocel A4M cellulose powder from the Dow Chemical Company.

The dry blend thus provided is mulled with sufficient water to wet the particles, and glacial acetic added in a proportion of 4 parts by weight for each 100 parts of powder is diluted with additional water and added slowly and evenly to the mix while mulling. Additional water is then added to the mixture until the total batch water (not including structural water from the boehmite or aluminum chlorhydrate binder additions) reaches 39 parts by weight of water for each 100 parts of the dry mix.

The resulting thick alumina paste is next extruded through –60 mesh screens and a "spaghetti" die five times to ensure homogeneous mixing and plasticizing of the batch, and is then extruded through both rod and honeycomb dies to form wet, green alumina rods and honeycomb structures from the batch.

To compare the drying and firing of the green rod and honeycomb structures produced from Batch A above with rods and honeycombs formed from conventionally formulated alumina honeycomb batches, a comparison batch (hereinafter Batch B) is prepared. Batch B is composed of the same powders and liquids as Batch A except that the aluminum chlorhydrate batch component of Batch A is omitted and replaced by an equivalent weight of the boehmite binder component. The compounding, mixing and extrusion of Batch B to form wet green extruded rods and honeycombs is otherwise the same.

Rods and honeycombs composed of the Batch A and Batch B formulations are wrapped in aluminum foil or placed in sealed glass tubes and dried at 85° C., and then selected samples of the dried rods and honeycombs are fired at either 600°, 700°, or 850° C. The fired rods and honeycombs are then evaluated and compared for shrinkage, strength, and active surface area.

Typical results for such a comparison are reported in Table I below. Included in Table I for each of the Batch A and Batch B products are flexural modulus of rupture (MOR) strength values, determined on rod samples in 3-point bending, and also effective active surface area values determined on the fired alumina materials by the conventional nitrogen BET adsorption method.

TABLE I

Fired Alumina Properties

| | MOR Strength (psi) | | | Surface Area (m2/g) | | | Shrinkage (%) |
|---|---|---|---|---|---|---|---|
| Firing Temp. (° C.) | 600 | 700 | 850 | 600 | 700 | 850 | 600–850° C. |
| Batch A | 2600 | 2700 | 2900 | 215 | 197 | 137 | 4–6% |
| Batch B | 2700 | 2600 | 2700 | 190 | 165 | 125 | 13–17% |

As is evident from a study of the data in Table I above, the MOR strength of the Batch A products substantially equal the strengths of the Batch B products, yet the active surface areas of the Batch A products are significantly higher. Thus the use of the binder combination of the invention in place of the conventional permanent binder has no adverse effect and may have a positive effect on the key strength and surface area characteristics of the fired honeycombs.

At least equally important and perhaps more important from the standpoint of economic advantage, the drying shrinkage of the Batch A products incorporating the binder combination is markedly lower than the drying shrinkage of the Batch B honeycombs. This unexpected result will have a major effect on production yields for extruded alumina honeycomb products, since cracking defects arising during the drying and firing steps of honeycomb production will be correspondingly reduced.

I claim:

1. A method for making a crack-free alumina honeycomb comprising the steps of:

providing a comminuted anhydrous aluminum oxide powder;

blending and mulling the powder with a
  hydrous aluminum oxide or aluminum hydroxide permanent binder,
  a polymeric aluminum salt,
  a temporary binder,
  an aqueous acidic peptizing agent, and
  water
to form a batch mixture;

homogenizing and plasticizing the batch mixture;

extruding the batch mixture into a honeycomb extrudate; and drying and firing the extrudate into a crack-free honeycomb.

2. A method in accordance with claim 1 wherein the comminuted anhydrous aluminum oxide powder is a gamma alumina powder having an average particle size not exceeding about 25 µm.

3. A method in accordance with claim 2 wherein the batch mixture comprises a combination of an aluminum chlorhydrate polymeric aluminum salt and a boehmite permanent binder, the combination being present in proportions effective to reduce alumina honeycomb shrinkage during the step of drying and firing to less than 10% by volume.

4. A method in accordance with claim 3 wherein the firing step is carried our at a temperature in the range of 500–1000° C.

* * * * *